Feb. 20, 1951  A. N. MULLIN  2,542,047
HOISTING PLATFORM FOR VEHICLES
Filed Feb. 27, 1948  2 Sheets-Sheet 1

Inventor
Alfred N. Mullin
By Munn, Liddy, Glaccum & Rich
attys.

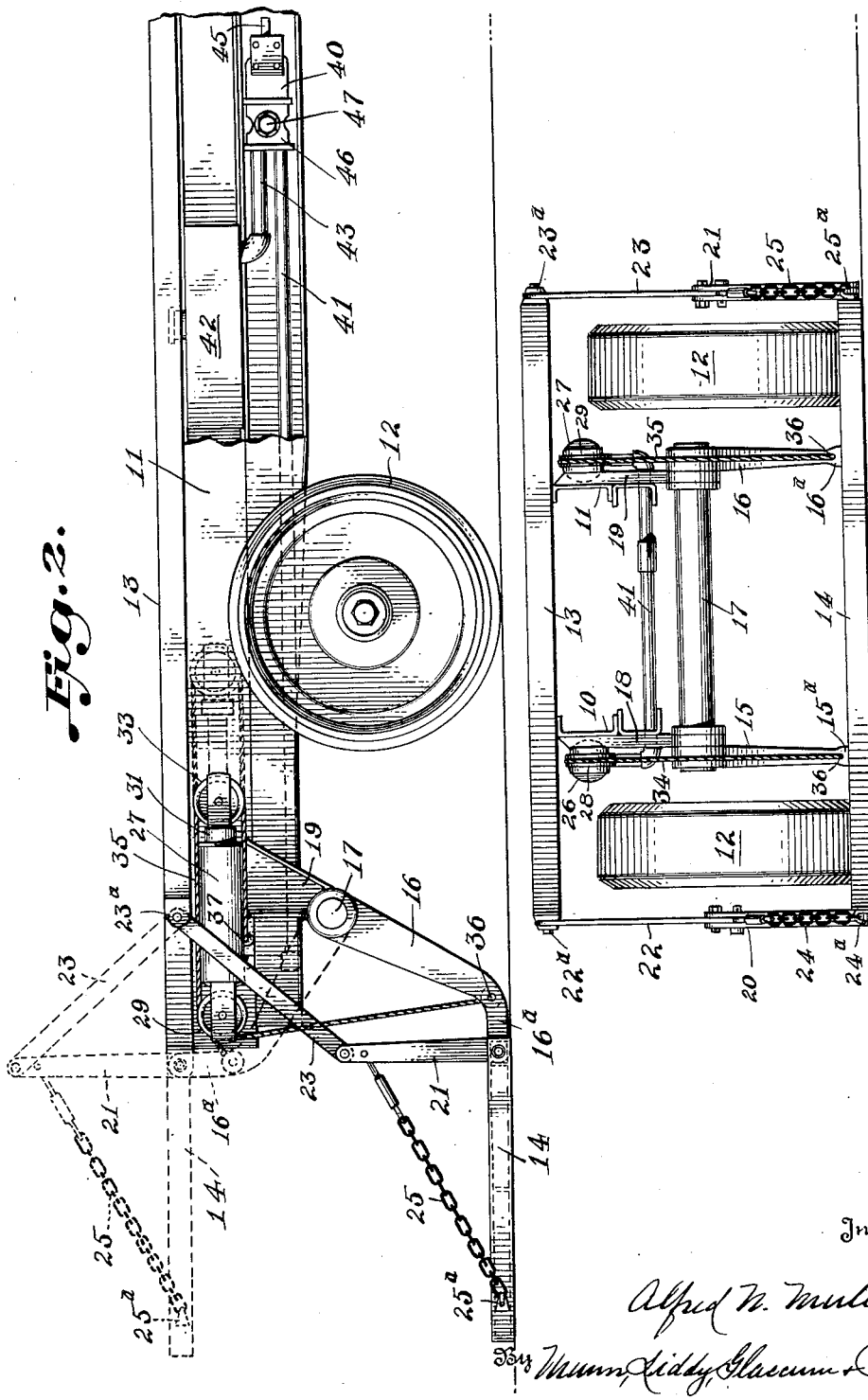

Patented Feb. 20, 1951

2,542,047

UNITED STATES PATENT OFFICE 2,542,047

HOISTING PLATFORM FOR VEHICLES

Alfred Nelson Mullin, Honolulu, Territory of Hawaii

Application February 27, 1948, Serial No. 11,651

2 Claims. (Cl. 214—77)

My present invention has for its object to provide as an adjunct to automobile trucks a hoisting platform by means of which goods, such as articles of freight, may be readily elevated from ground level into the plane of the flooring or platform of the truck body.

Another object of my invention is to provide a hoisting platform and its accompanying operating mechanism in the nature of an attachment for vehicles, the parts being so arranged that they may be readily applied to existing trucks without dismantling or reconstructing either the vehicle chassis or the body carried thereon.

My invention further comprehends in conjunction with a hoisting platform of an operating mechanism comprising hydraulic cylinders which are to be fixed to the sides of the frame members of the chassis in conjunction with pairs of sheaves by means of which cables are operated to raise and lower the platform, the required pressure for operating the cylinder pistons being derived from a suitable pump, also carried on the vehicle frame and operated from a suitable source of power which may be the automotive engine, the pump generated pressure delivered to the cylinders being regulated by a manually operated valve.

To these and other ends my invention embodies further objects all as will be fully set forth in the accompanying specification, the novel features thereof being set forth in the appended claims.

In the drawings:

Figure 2 is a side elevation thereof.

Figure 3 is a rear end view.

Similar reference characters in the several figures indicate similar parts.

Figure 1:
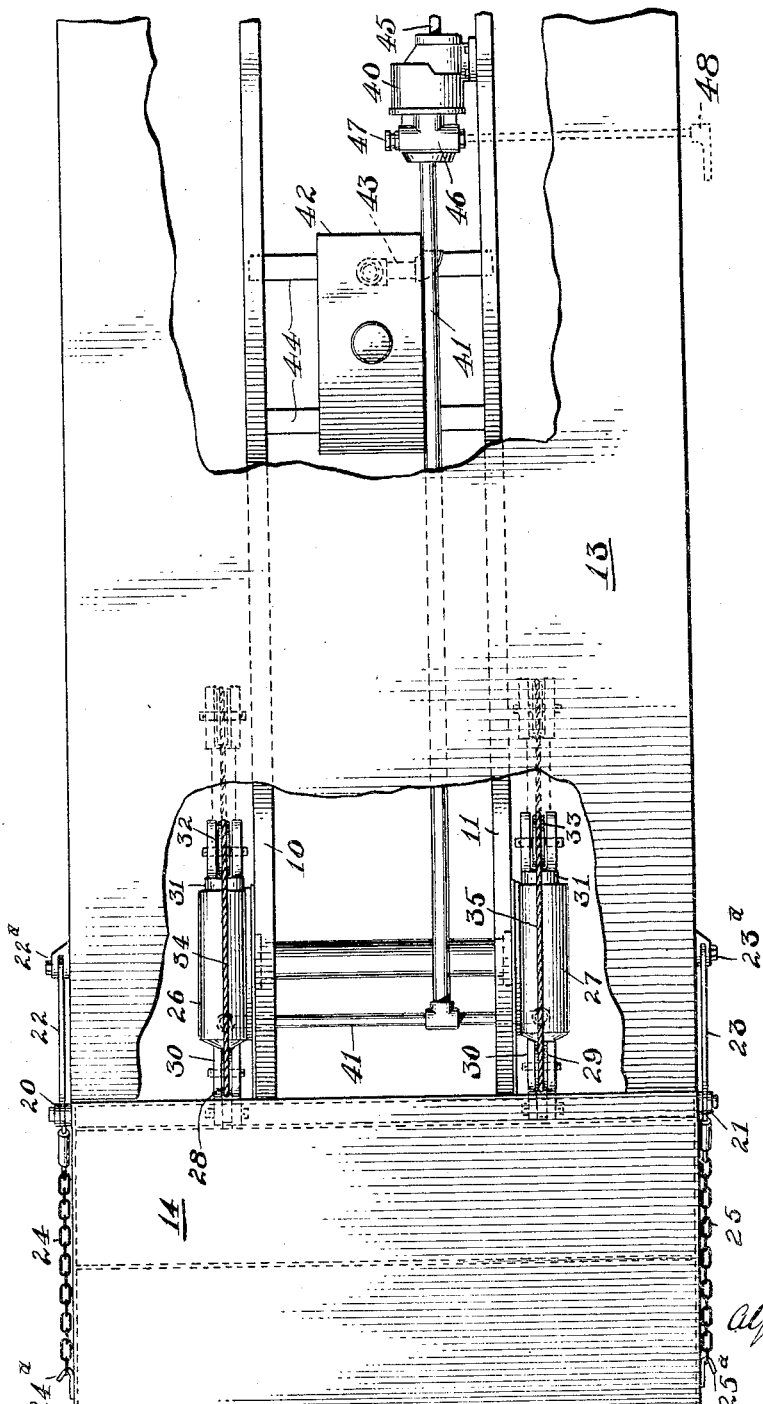
Figure 1 is a top plan view showing the rear end portion of an automobile truck to which the elements comprising my invention have been applied.

I have illustrated my invention as applied to an automobile truck and have shown the parts thereof which are more or less of standard construction and comprise a chassis composed of spaced frame members 10, 11. These are preferably parallel, especially at their ends, and are carried on the pair of rear wheels 12 by any suitable spring suspension as will be understood. The frame members are of the usual angle iron construction, which may be a single channel piece or two of such pieces superposed and arranged to provide alined vertical outer surfaces. The chassis carries any desired body construction, of which for the purpose of simplicity, I only illustrate the platform or flooring 13 which carries the imposed load.

In carrying out my invention I provide a hoisting platform located in rear of the truck platform and secure it in operative position by means of jointed connections attached to the underside of the rear end of the chassis and operate these by means of a hydraulic system carried on the chassis and comprises cylinders with pistons mounted on the sides of the frame pieces at their rear ends to which pressure is supplied from a pump and fluid tank disposed between said side pieces at a forward point.

The hoisting platform 14 may extend the full width of the body flooring 13 and is of a depth suitable to accommodate the average size of the packages or heavier pieces of freight customarily handled on the truck to which it is applied. The jointed operating connections by means of which the platform is maintained in a horizontal position while being elevated vertically from ground level into alinement with the flooring, comprise two arms 15, 16. These are attached rigidly to the ends of a cross bar or shaft 17 journaled in brackets 18, 19 attached to the outer or lateral faces of the frame members 10, 11, located a sufficient distance forwardly of the ends of said members so that the outer ends 15$^a$, 16$^a$ of arms 15, 16 will extend parallel with the platform when it is in its lowermost position, as shown in Fig. 2, and can project upwardly, as illustrated in dotted lines, to clear the rear end of the truck frame when the platform is in elevated position. Operating conjointly with the arms 15—16 there extends upwardly from the forward edge of the platform, at its ends, two vertical arms or brackets 20—21, the upper extremities of which are connected to stabilizer links 22—23 pivoted at 22$^a$, 23$^a$ to the truck body and operate somewhat in the manner of a jack knife as the platform is raised or lowered. The outer edge of the platform may also be supported by chains 24—25 which extend diagonally from the upper ends of the vertical arms to hooks 24$^a$—25$^a$ on each end of the hoisting platform. When the vehicle is loaded the platform 14 may be rotated into a vertical position to serve as a tail gate.

In order to raise and lower the hoisting platform I employ twin cylinders 26—27 which I mount on the sides of the rear ends of the frame pieces of the chassis, preferably on their outer faces. In rear of the respective cylinders are sheaves 28—29 which are mounted in journals fixed with relation to the chassis. A convenient means of mounting them is to provide parallel bracket arms 30 carried on and formed as part of each cylinder. The latter are provided with the usual pistons having piston rods 31 projecting from the forward ends of the cylinders, the extremities of which may be bifurcated to carry the journals of other sheaves 32—33. The respective pairs of sheaves are alined and roved, or looped, around them are separate cables 34—35, one end of each being attached to the hoisting platform arms, as indicated at 36 in Figs. 2 and 3, their other extremities being anchored with relation to the chassis, as by securing them to the under sides of the respective cylinders, as indicated at 37 in Fig. 2. From this arrangement of the parts it will be seen that outward movement of the pistons, causing the sheaves 32—33 to travel in a direction forwardly of the chassis, will impart movement to the cables to cause the arms 15—16 to elevate the platform from the full line position, shown in Fig. 2, to its dotted line position.

At a convenient location forward of the cylinders I mount on one of the frame members, and preferably on its inner side a suitable pump 40 for developing fluid pressure for operating the pistons and connect it with the respective cylinders by means of piping 41. A fluid reservoir, such as an oil tank 32, is located adjacent the pump and connected to its inlet by a pipe 43. This tank is conveniently supported in a protected position between the frame pieces 10—11, as for instance on cross rails 44.

The pump drive shaft 45 may be operated either by suitable drive connections (not shown) from the usual power transmission of the tank, or from a separate source of power carried on the truck, as will be readily comprehended.

In the pressure transmission system I locate a control valve 46 which may be incorporated as part of the pump, as will be seen from Fig. 1. For operating the stem 47 of this valve a removable handle, as shown in dotted lines in Fig. 1, and indicated by 48, may be employed.

From the foregoing disclosure it will be readily comprehended that I have provided an assembly of parts capable of being applied as a unit to a truck thus equipping it with a hoist without the necessity of dismounting the body or disassembling any of its structural features.

I claim:

1. The combination with an automobile truck chassis having spaced parallel frame members carrying a flooring, a hoisting platform in rear of the flooring, and stationary brackets attached to the sides of the frame members and depending therefrom, of substantially L-shaped arms having the upper end of the long leg of the L journaled on the brackets and the short leg of the L pivotally connected to the platform, other jointed members connecting the platform and chassis which serve in conjunction with said arms to support the platform in a horizontal position and permit its bodily movement vertically, hydraulic cylinders also connected to the sides of the frame members above said brackets, sheaves journaled on the ends of the rear ends of the cylinders, each of the latter having a piston and a piston rod extending from its forward end, other sheaves carried by said rods, cables roved over the respective sheaves of the two cylinders and connected at their outer ends to the platform carrying arms and at their other ends to frame members.

2. The combination with an automobile chassis having spaced frame side members carrying a flooring, a hoisting platform in rear of the flooring, jointed means connected to the platform serving to support the platform in a horizontal position and guide it for vertical movement, of a pair of hydraulic cylinders mounted on the outer sides of the rear ends of the frame pieces, a sheave journaled in stationary bearings in rear of each cylinder, each of the latter having a piston with a piston rod extending from its forward end and sheaves carried on said rods, cables passing around the sheaves, each connected at one end to the platform and at the other extremity to the chassis, a fluid tank located between the frame members, a pressure generating pump mounted on one of the latter, piping connections between the tank, pump and cylinders and a pressure regulating valve located in said piping between the pump and cylinders.

ALFRED NELSON MULLIN.

REFERENCES CITED

The following references are of record in the file of this patent:

UNITED STATES PATENTS

| Number | Name | Date |
| --- | --- | --- |
| 2,019,938 | Stephens | Nov. 5, 1935 |
| 2,298,166 | Richards | Oct. 6, 1942 |
| 2,348,993 | Novotney | May 16, 1944 |
| 2,386,216 | Hay | Oct. 9, 1945 |
| 2,390,268 | Penney | Dec. 4, 1945 |
| 2,481,994 | Ginder | Sept. 13, 1949 |